June 19, 1962  J. R. GREENO ETAL  3,040,167
AUTOMATIC HEAT TREATING MACHINE
Filed March 14, 1960  8 Sheets-Sheet 7

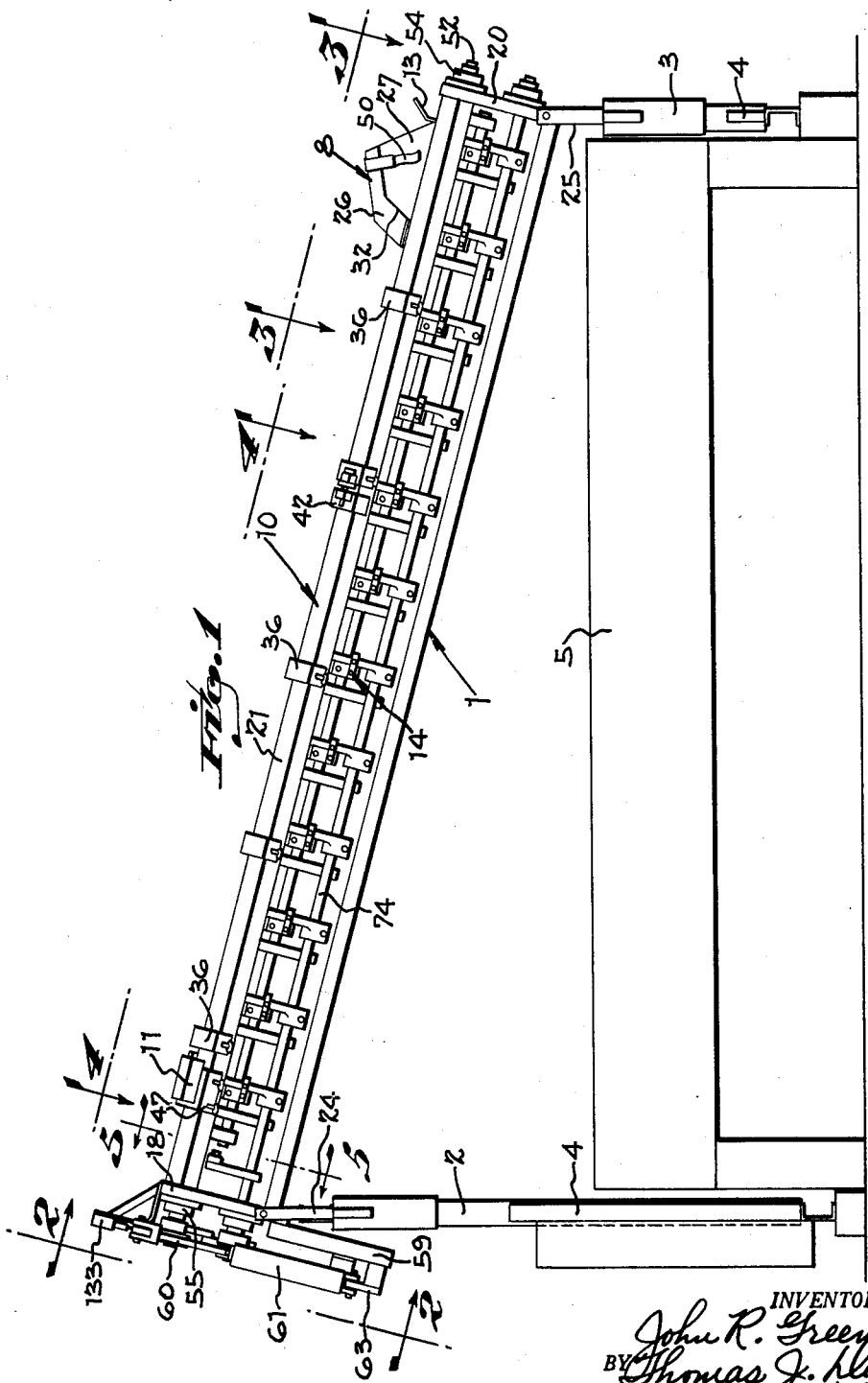

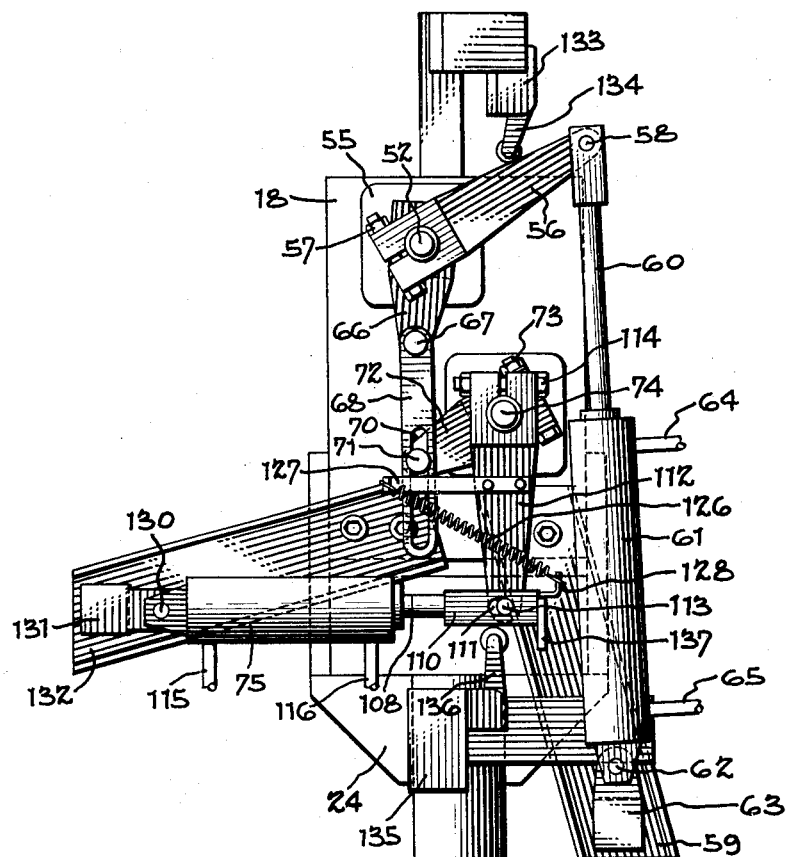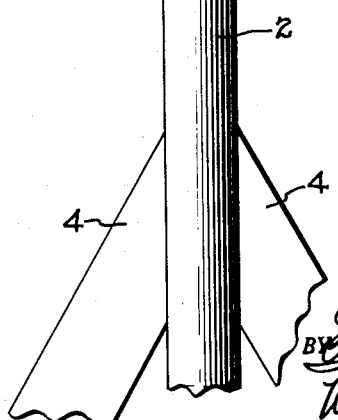

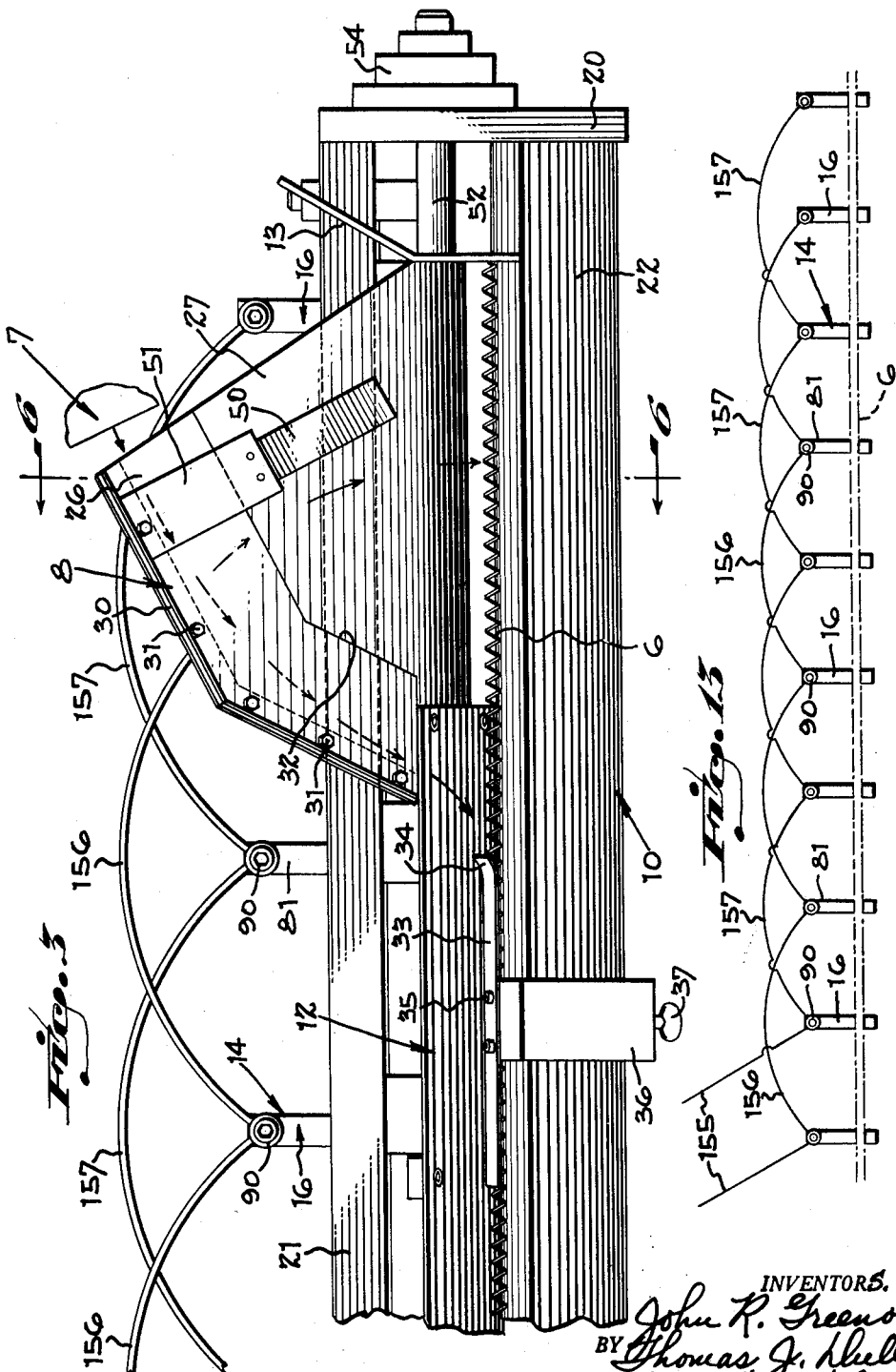

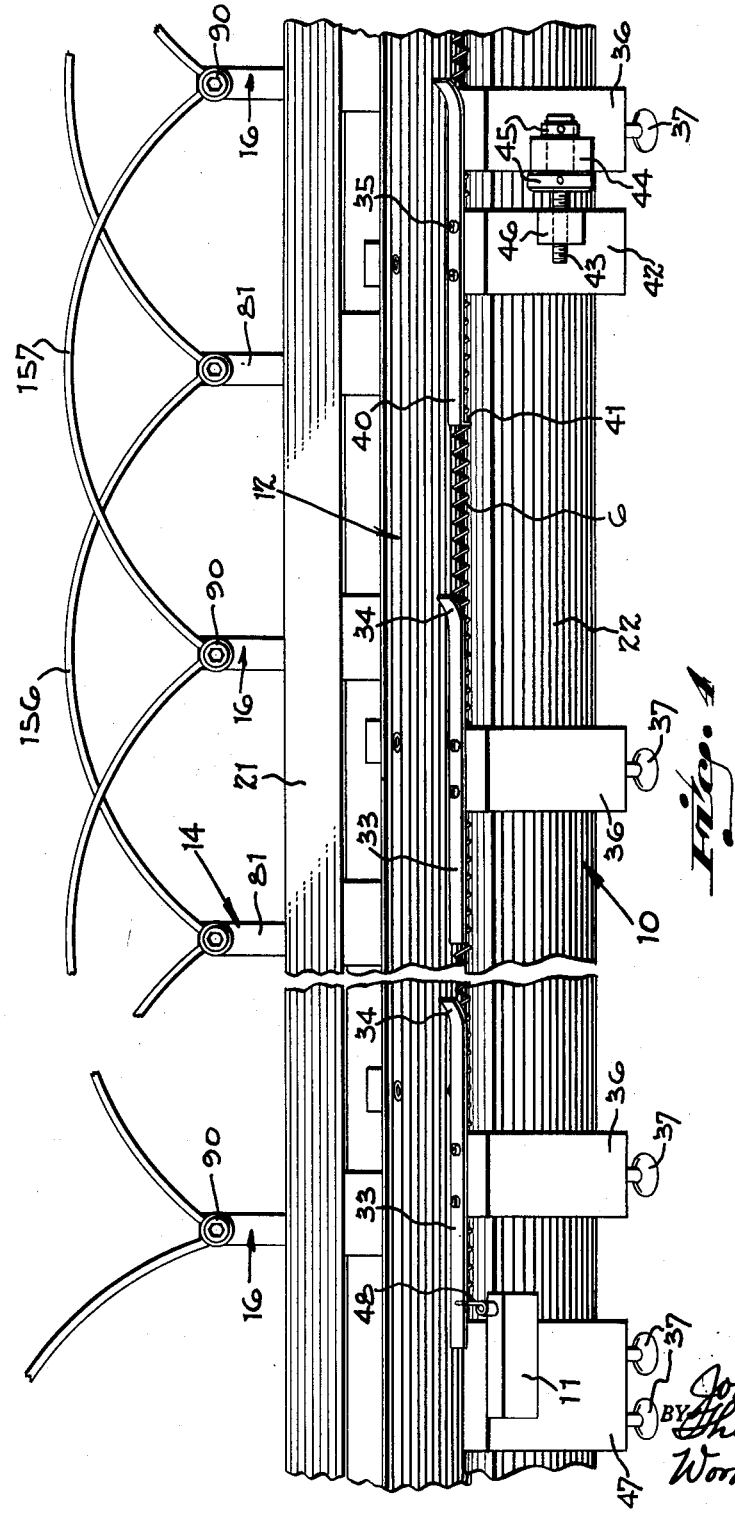

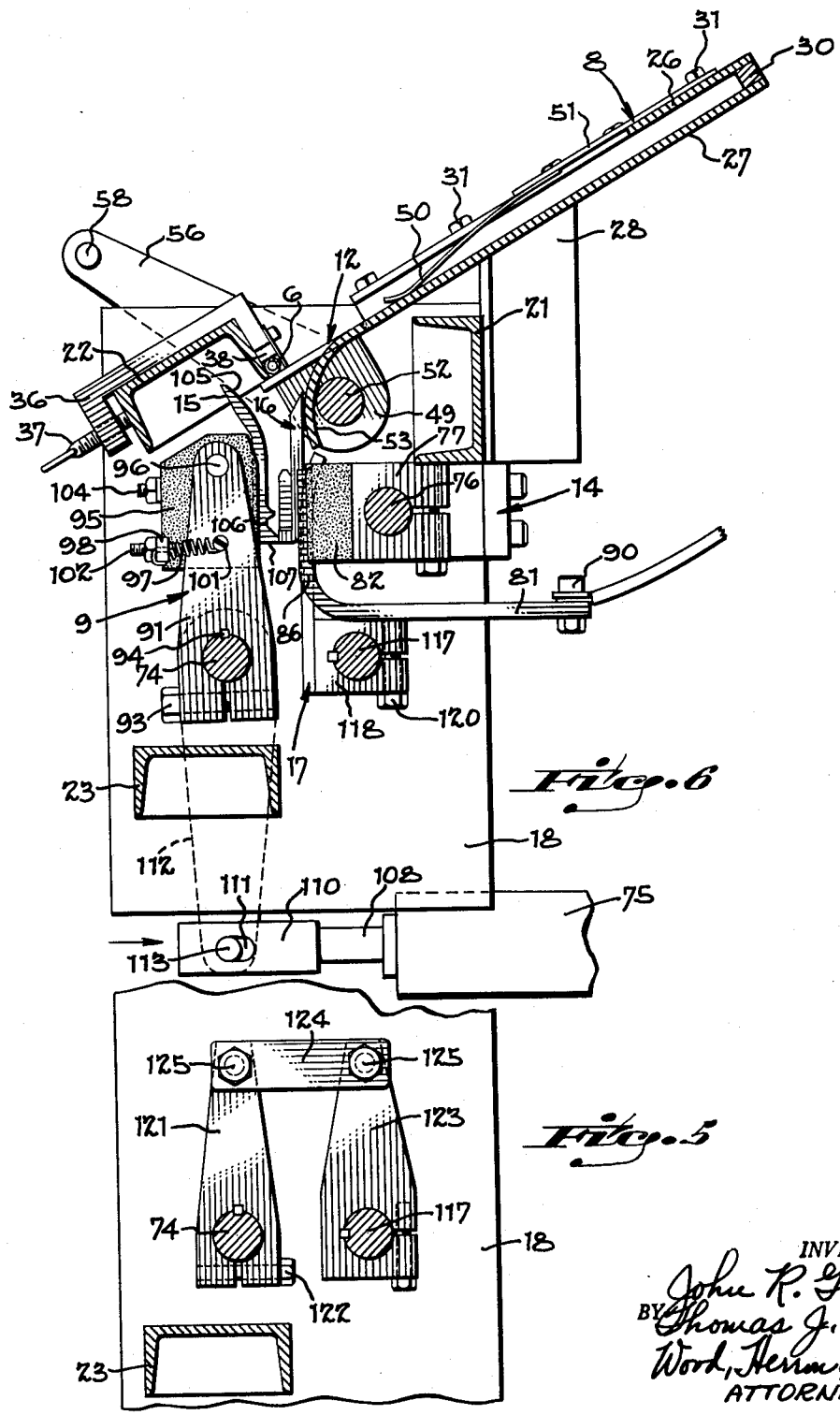

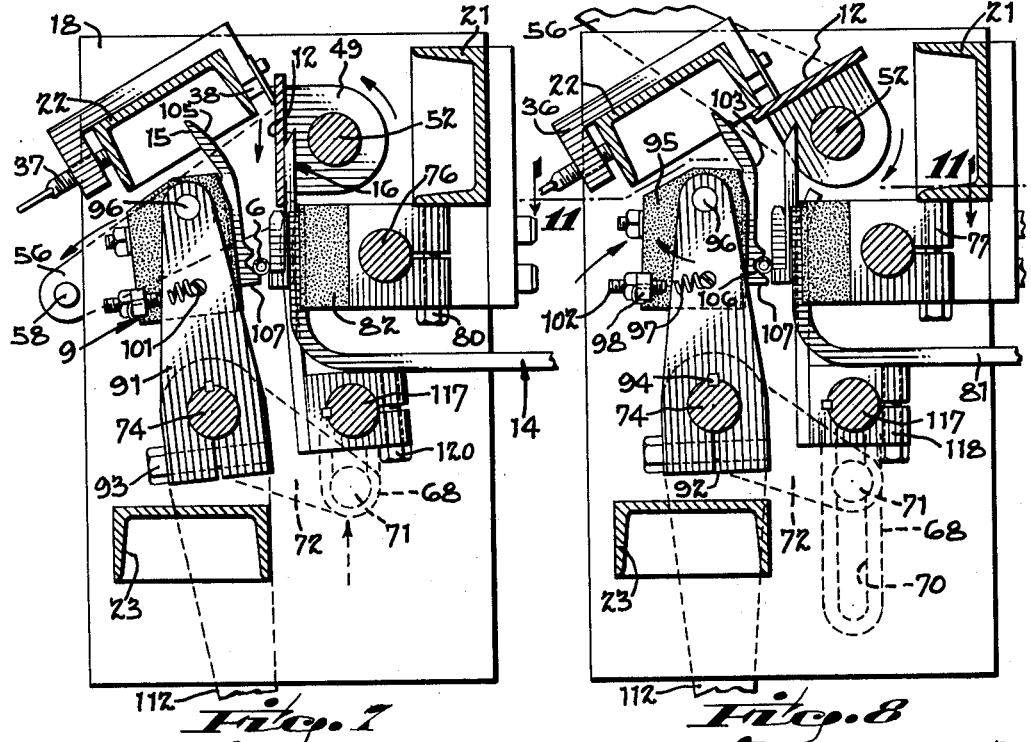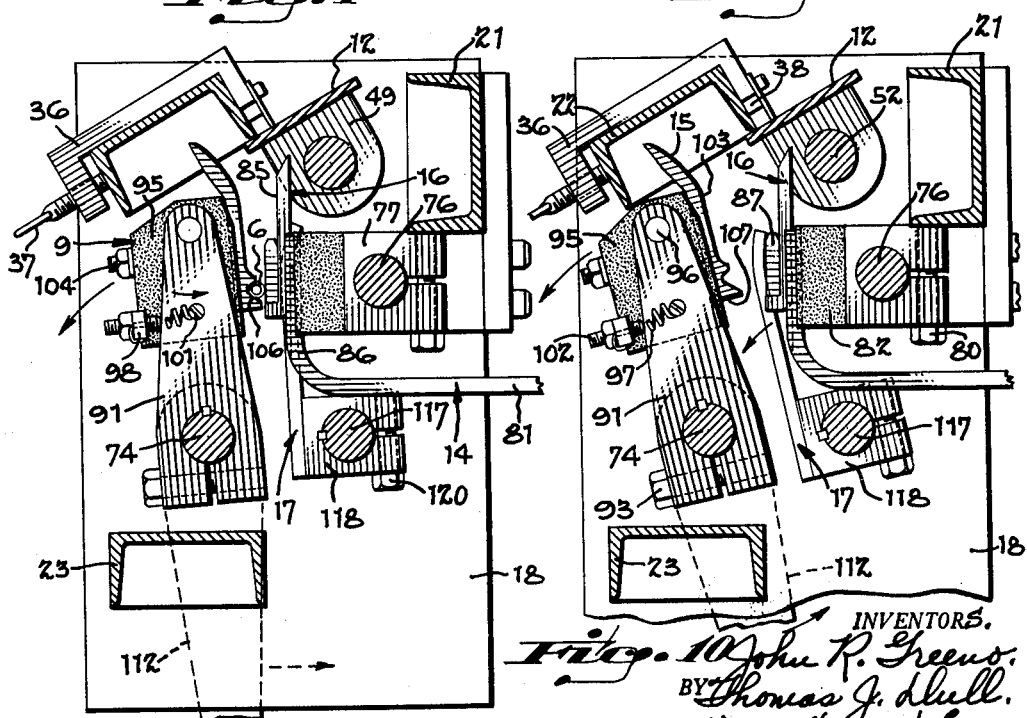

INVENTORS.
John R. Greeno.
Thomas J. Dull.
BY Wood, Herron & Evans.
ATTORNEYS.

United States Patent Office 3,040,167
Patented June 19, 1962

3,040,167
AUTOMATIC HEAT TREATING MACHINE
John R. Greeno, 219 Hill Top Lane, Wyoming, Ohio, and
Thomas J. Dull, 1293 Prospect Place, Cincinnati, Ohio
Filed Mar. 14, 1960, Ser. No. 14,648
16 Claims. (Cl. 219—156)

This invention relates to a heat treating machine which is adapted to normalize workpieces in a rapid, automatic manner, utilizing electrical energy to bring the workpieces to the treating temperature. The present machine is intended particularly for treating the helical wires which are used in the manufacture of coil spring sections for mattresses or the like.

In the manufacture of spring sections of this character, loose individual coil springs are positioned in row formation, then the helical wires are rotated and advanced in corkscrew fashion upon mating portions of the terminal coils. The helicals thus provide hinged connections between the adjoining rows of coil springs at top and bottom to make up the spring assembly.

The helical wires are prefabricated from a straight length of wire by a power operated coil forming machine of conventional design, which is arranged to draw the wire from a reel and to force it by power through a suitable forming mechanism which winds the straight wire into the form of a continuous helical. The coiling machine is also arranged to sever the helical into predetermined lengths as it is formed. The coiling operation naturally imparts strains to the carbon steel wire and also makes the wire non-uniform in structure, making the helical unfit for its intended use.

In order to impart the desired physical properties after formation of the helical, it has been the practice to temper or normalize the pieces at a treating temperature before the helicals are used in the spring units. For this purpose, it has been customary to heat treat the helicals in batches at a temperature in the neighborhood of 500° F. with the batch of helicals confined in a suitable receptacle which is placed in a treating furnace or oven. However, batch treating is a relatively slow operation due to the handling problem; moreover, it is difficult to obtain uniform results because the application of heat varies throughout the batch within the receptacle.

One of the primary objectives of the present invention has been to provide an automatic machine whereby each helical is subjected to a rapid individual heat treatment immediately after it issues from the coiling machine, thereby to avoid the extra handling which is involved in the batch treatment of the helicals.

In general, the heat treating machine comprises an elongated helical guide having a tiltable table which supports the helical as it advances from the coiling machine, coacting with an elongated electrode assembly, having shiftable jaws, disposed beneath the tilt table. The treating machine is mounted adjacent the discharge end of the coiler, such that the helical passes directly into the guide mechanism as it issues from the coiler, the cycles of operation of the heat treating machine being initiated in response to the advancement of the helical across the tilt table of the guide mechanism.

When a helical of the required length has been advanced into the guide mechanism, the leading end of the helical trips a limit switch, whereupon a control circuit causes the coiling machine to sever the helical and stop the coiling operation temporarily. At this point, the control system causes the table to tilt to an inclined dumping position and also causes the jaws of the electrode assembly to shift to a slightly open position, such that the helical drops directly into the jaws. Thereafter, the jaws clamp the helical in contact with the electrodes, electrical energy is applied to the electrodes to heat the wire, then the jaws open to allow the treated helical to drop by gravity from the electrode assembly thus ending the cycle.

In order to speed up the machine, the coiler, which is interconnected in the control circuit, is restarted as soon as the helical is discharged from the tilt table, whereby a successive helical may be delivered to the electrode assembly immediately after the treated helical is discharged. The cycles of operation are quite rapid since electrical current is applied to each helical for less than one-half second to bring the helical to the required temperature, the average operating speed being in the neighborhood of 35 to 50 pieces per minute.

A further objective of the invention has been to provide an electrode and jaw assembly which heats the helical to the same temperature throughout its entire length for uniform treatment; also to provide a structure which imparts a rotary motion to the helical as it is clamped and unclamped, thereby to provide a good electrical connection and to prevent the helical from being electrically welded to the electrodes.

According to this aspect of the invention, there is provided a series of stationary electrode elements and respective clamping jaws which shift in forward and reverse directions to clamp and unclamp the helical with respect to the electrodes. The electrodes are located at spaced points along the helical and the power circuit provides individual circuits through the helical between adjacent electrodes so as to heat the helical to a uniform temperature throughout its entire length.

In order to impart the rolling motion to the helical, each clamping jaw is mounted for rocking motion upon its actuating arm and is spring biased toward a slightly open position. The arrangement is such that the jaw rocks slightly both during its closing and opening movements, thereby to frictionally impart rotary motion to the helical throughout its entire length.

A further objective has been to provide a simplified actuating mechanism for tilting the table and actuating the clamping jaws, whereby the jaws are opened slightly to receive the helical as the table shifts to its tilted position to deliver the helical to the electrode assembly for treatment.

For this purpose, the table and clamping jaws are operated sequentially by respective fluid pressure cylinders which are energized by electrically operated valves interconnected with the control circuit. The table-actuating cylinder includes a linkage arrangement which partially opens the jaws independently of the jaw-actuating cylinder when the table reaches its fully tilted position, adapting the jaws to receive the helical as it drops by gravity from the tilted table. The table cylinder thereafter shifts the table back to its normal position to receive the next helical; the jaw-actuating cylinder shifts the jaws to their fully opened position after the electrode assembly has been energized, so as to discharge the helical at the end of the heat treating cycle. In order to provide positive discharge of the helical, ejector fingers are mounted adjacent the electrodes. These fingers are linked to the jaws and shift to ejecting position to engage the helical and dislodge it from the electrodes as the jaws open.

The various features and advantages of the invention will be more fully apparent to those skilled in the art from the following detailed description taken in conjunction with the drawings.

In the drawings:

FIGURE 1 is a side elevation showing the general arrangement of a heat treating machine constructed according to the principles of the present invention.

FIGURE 2 is an enlarged end elevation, as viewed along line 2—2 of FIGURE 1, illustrating the actuating cylinders and linkage of the machine.

FIGURE 3 is an enlarged fragmentary top plan, as viewed along line 3—3 of FIGURE 1, illustrating the intake end of the machine.

FIGURE 4 is a fragmentary plan similar to FIGURE 3, as viewed along line 4—4 of FIGURE 1, showing another portion of the machine.

FIGURE 5 is an enlarged cross sectional view, taken along line 5—5 of FIGURE 1, showing the mechanical linkage which interconnects the jaw-actuating shaft and ejector shaft for operation of both shafts from a single power cylinder.

FIGURE 6 is a sectional view taken along line 6—6 of FIGURE 3, showing the guide mechanism which regulates the advancement of the helical wire from the coil forming machine into the heat treating machine.

FIGURE 7 is a view similar to FIGURE 6, showing the clamping jaws shifted to their partially opened position, with the tilt table shifted to its dumping position, whereby the helical is dropped in place between the heat treating jaws ready to be clamped and heat treated.

FIGURE 8 is a view similar to FIGURE 7, showing the jaws shifted to their clamping position for the heat treatment cycle, with the table shifted back to its normal position for receiving the next helical wire.

FIGURE 9 is a sectional view similar to FIGURE 7, showing the initial rotary motion of the jaws as they begin to open to discharge the helical wire after heat treatment thereof.

FIGURE 10 is a view similar to FIGURE 7, showing the clamping jaws shifted to the fully open position for discharging the heat treated helical wire.

FIGURE 13 is a diagrammatic view showing the electrical power circuit of the electrodes.

*General Arrangement*

Figure 11:
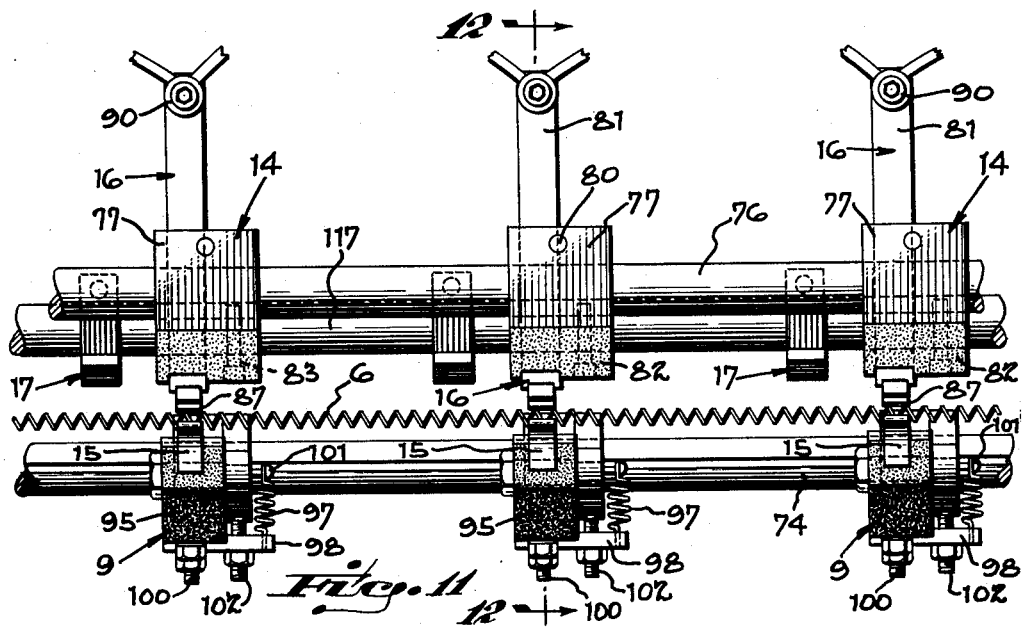
FIGURE 11 is a fragmentary top plan, as viewed along line 11—11 of FIGURE 8, further illustrating the arrangement of the clamping jaws and electrodes.

Referring to FIGURE 1, the machine which embodies the principles of the invention comprises a bed, indicated generally at 1, which is supported in an inclined plane upon columns 2 and 3 located at opposite ends of the bed. The columns are suitably braced as at 4 in order to resist lateral deflection. An elongated receptacle 5 is mounted in a horizontal plane beneath the bed in a position to receive the treated helical wires 6 as they drop by gravity from the heat treating apparatus which is mounted upon the bed.

As indicated by the arrows in FIGURE 3, the helical wires 6 are advanced in corkscrew fashion from the delivery end 7 of a conventional coiling or helical forming machine (not shown in detail) which is of conventional design. In general, the forming machine is arranged to advance a straight wire from a suitable reel and to force it by power through a coiling mechanism so as to coil the straight wire into helical form. During the coiling operation, the helical wire is rotated and advanced from the forming machine to a guide chute, indicated generally at 8 (FIGURE 3) which forms a part of the helical guide and feed mechanism 10 of the heat treating machine.

The guide structure 10 includes a limit switch 11 (FIGURE 4) which is tripped by the leading end of the helical each time the length of the helical is advanced from the coiling machine. The coiling machine is driven through an electrically operated clutch which decommissions the coiling machine and severs the helical in response to operation of the limit switch 11. In order to provide automatic operation of the several components in time with the coiling machine, the limit switch 11 is interconnected in a control circuit which regulates the several operations during each cycle of operation, as explained later with reference to FIGURE 14.

As the helical wire is advanced through the guide structure 10, it is supported upon an elongated tilt table 12 which normally resides in the laterally inclined position as shown in FIGURES 6 and 8. The guide structure 10 includes suitable means for guiding the advancing helical 6 in a straight line path along the table 12. After the length of helical wire is fully advanced along the table to trip the limit switch 11, its opposite end is severed by a cutting device (not shown) which forms a part of the coiling machine. The severed end portion then drops in place upon the table, as indicated by the arrows in FIGURE 3, the trailing end being guided in place by an inclined guide plate 13.

After being severed, the length of the helical wire 6 rests momentarily upon the elongated table 12 (FIGURE 6), then the control circuit, through operation of limit switch 11, causes the table to be tilted laterally to the position shown in FIGURE 7. Upon tilting motion of the table, as indicated by the arrows, the severed helical wire 6 drops by gravity into the electrode assembly which is indicated generally at 14.

Figure 12:
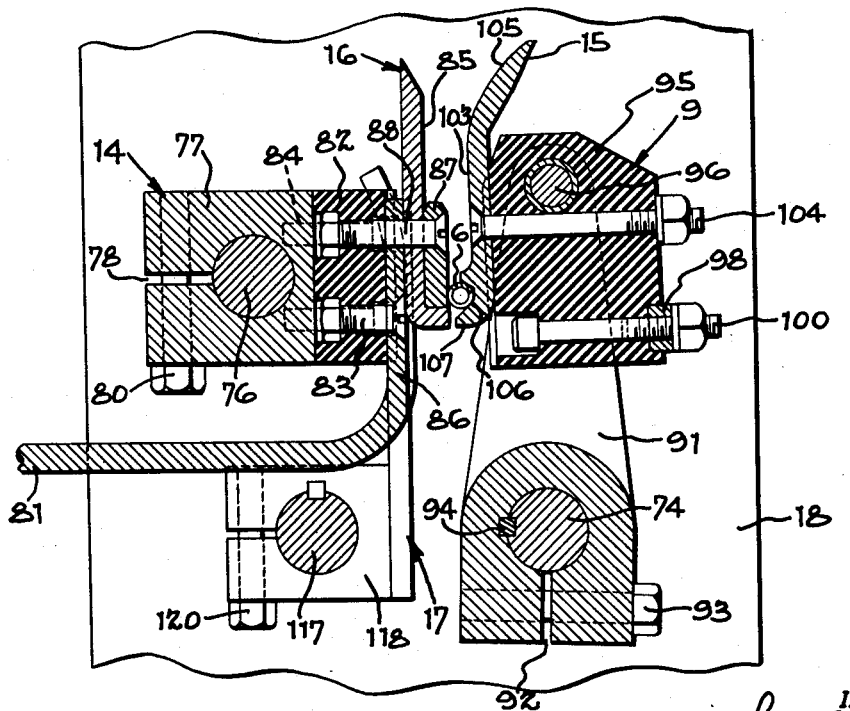
FIGURE 12 is a sectional view taken along line 12—12 of FIGURE 11, detailing the structure of the jaws and electrodes.

As described later in detail, the electrode assembly comprises respective stationary electrodes spaced apart in a position to contact the helical wire at points spaced along its length (FIGURES 11 and 12). The individual electrodes are interconnected in an electrical power circuit to heat the length of helical wire to a uniform normalizing temperature throughout the length of the helical wire. In order to establish electrical contact, a clamping jaw assembly indicated generally at 9 clamps the helical wire against the electrodes to establish the individual circuits.

As explained later in detail, the jaw assembly is provided with individual clamping jaws 15 which shift relative to a series of stationary electrodes indicated generally at 16 (FIGURES 11 and 12). During their clamping and unclamping motion, the jaws 15 rock while under clamping engagement with the helical wire so as to rotate the wire slightly, creating a wiping contact with respect to the electrodes. As explained later in detail, this wiping motion prevents the helical wire from becoming welded to the electrode surface upon being heated, and also improves the electrical contact between the electrode surface and helical wire.

The jaws are shifted to the slightly open position of FIGURE 7 when the table tilts so as to receive the helical. Thereafter, the jaws close (FIGURE 8) and electrical energy is applied to the electrodes to heat the helical.

After the application of the heating current for a timed interval, the heat circuit is deenergized, then the jaws 15 are shifted to the unclamping position as shown in FIGURE 10. This permits the treated helical wire to drop by gravity from the electrode assembly to the receptacle 5 which is mounted beneath the bed.

In order to eject the treated helical in a positive manner, the electrode assembly 14 is provided with a series of ejector fingers, indicated generally at 17 (FIGURE 11). These fingers normally reside in a retracted position (FIGURES 7-9) and shift to the position of FIGURE 10 as the jaws 15 shift to their open position. Should the helical wire adhere to the stationary electrodes at any point, the ejector fingers dislodge the helical in a positive manner.

*Helical Guide and Feed Mechanism*

As shown generally in FIGURE 1, the bed of the machine includes a pair of end plates 18 and 20 joined by three parallel channel irons 21, 22 and 23 (FIGURE 6) having their opposite ends welded or otherwise secured to the opposed end plates. The channel irons and end plates provide a rigid frame structure for supporting the components of the machine. The end plates are attached to the columns 2 and 3 by means of the brackets 24 and 25 (FIGURE 1) thus supporting the bed in its inclined plane.

As detailed in FIGURES 3 and 6, the chute 8 comprises a pair of spaced plates 26 and 27 mounted in a transversely inclined plane upon a bracket 28 which rises from the upper channel iron 21. The plates 26 and 27 are held in spaced relationship by a spacer bar 30, which thereby delineates a passageway for the helical wire as it issues from the forming machine 7. As shown in FIGURE 3, the plates 26 and 27 are secured to the spaced bar by a series of screws 31. In order to guide the helical, the outer portion of the bar 30 extends generally in parallelism with the path of motion of the helical as it issues from the coiler 7 while the inner portion of the bar is inclined downwardly as at 32. As the leading end of the rotating helical advances through the passageway delineated by the chute 8, it is deflected downwardly through the tilt table 12, which normally assumes the position in FIGURE 6, with its lower edge in contact with the edge of channel iron 22. The channel and table thus form two sides of a guide way for the helical.

In order to hold the helical 6 within its guide way, there is provided a series of guide bars 33 (FIGURES 3 and 4) each having an upwardly curved receiving end 34. Each guide bar is attached by screws 35 to a mounting block 36. The mounting blocks, which are generally U-shaped (FIGURE 6), are slidably fitted upon the channel 22 and are locked in adjusted position by respective thumb screws 37 threaded through one leg of the block into engagement with the side of the channel, as seen in FIGURE 6. Each guide bar 33 overhangs the lower edge of the mounting block, such that the guide bar and block encloses the other two sides of the guide passageway which is partially delineated by the channel 22 and tilt table 12. To prevent interference, the end of each guide block is tapered downwardly as at 38 (FIGURE 6) such that the leading end of the advancing helical is cammed downwardly should it contact the mounting block.

In order to advance the rotating helical in a more positive manner, one or more of the guide bars, indicated at 40, are provided with a right angular lip 41 (FIGURE 4) which projects downwardly into the path of motion of the helical. The guide bar is mounted for adjustment in a line parallel with the helical in order to locate the lip 41 in relation to the pitch of the helical. For this purpose, the guide bar 40 is mounted upon a block 42 which is slidable relative to the channel 22. For adjustment of block 42, there is provided a fixed mounting block 36 secured in position by a thumb screw 37, and having an adjustment screw 43 rotatably journalled therein as at 44. The adjustment screw is locked against endwise motion by collars 45—45 and its outer end passes in threaded engagement through a lug 46 mounted on block 42. Rotation of the adjustment screw thus shifts the block and guide bar 40 longitudinally along the channel 22.

The limit switch 11 (FIGURE 4) is attached to a mounting block 47 which is also fitted upon the channel 22, similar to the mounting blocks 36. Block 47 includes a pair of thumb screws 37—37 engaging the channel. The limit switch includes a shiftable finger 48 extending into the guide passageway of the helical beneath the last guide bar 33 of the series such that the leading end of the helical trips the finger. The switch, in turn, stops the coil forming machine, and causes the trailing end of the helical to be severed from the coil forming machine 7. The severed end of the helical then drops downwardly, as indicated previously, and passes under a leaf spring 50 which is attached as at 51 to the plate 26 (FIGURE 3). The leaf spring yields readily and acts as a guide with respect to the end portion of the helical as it springs downwardly to the position of FIGURE 3.

The length of the helical, for which the machine is set up, is determined by the position of the limit switch 11, since this switch controls the cycles of the helical forming machine. This adjustment is made simply by loosening the thumb screws 37 and sliding the block 47 and limit switch to the desired position.

Tilt Table

The tilt table 12, which supports the helical as it is advanced into the guide mechanism, is mounted upon a rock shaft 52 (FIGURE 6) by means of lugs 49. As viewed in FIGURE 6, the table extends from the chute 8 and resides in a plane common to the bottom plate 27 of the chute. The lower portion of the bottom plate 27 beyond the table is curved downwardly as at 53 to provide a guide surface leading to the electrode assembly 14. The rock shaft 52 passes behind the curved portion 53 of the plate and one end thereof is journalled in a bearing 54 attached to the end plate 20 (FIGURE 3). The opposite end of the rock shaft 52 is journalled in a similar bearing 55 mounted on the end plate 18 (FIGURE 2).

After the advancing helical trips the limit switch 11, the control circuit causes the table 12 to be shifted from the support position of FIGURE 6 to the dump position of FIGURE 7, thereby dropping the helical into the electrode assembly 14, as indicated by the arrow in FIGURE 7. The tilting motion is imparted to the table by a lever 56 (FIGURES 2 and 6) which is clamped by a bolt 57 to the end of the rock shaft 52. The outer end of the lever 56 is pivotally connected as at 58 to the piston rod 60 of an air cylinder 61. The lower end of the air cylinder is pivotally connected as at 62 to a bracket 63 which is attached to a fixed channel 59 projecting downwardly from the end plate 18. This cylinder is provided with conduits 64 and 65 which are interconnected with a solenoid valve to shift the piston and piston rod in forward and reverse directions in response to the control circuit as explained later with reference to FIGURE 14.

It will be understood at this point that jaws 15 of the electrode assembly 14 are opened partially, as indicated by the arrow in FIGURE 7, to receive the helical as it drops from the table 12. In order to impart this motion to the jaws, a second lever 66 (FIGURE 2) is clamped to the rock shaft 52. Lever 66 is pivotally connected as at 67 to a link 68, which is slotted as at 70. A pin 71 projects from a lever 72 and passes through the slot 70. Lever 72 is clamped by a bolt 73 to a rock shaft 74 which actuates the jaws of the electrode assembly.

As the lever 56 swings the table to its inclined dumping position, the slot 70 traverses the pin 71, and before the table reaches its vertical position (FIGURE 7) the lower end of slot 70 engages the pin 71, so as to raise lever 72 slightly. This motion of lever 72 shifts the jaws of the electrode assembly from the closed position of FIGURE 6 to the partially open position of FIGURE 7.

After the helical has been delivered to the electrode assembly, the control circuit shifts the solenoid valve of cylinder 61 to direct air pressure in the reverse direction, causing the piston to shift the table back to its normal position as shown in FIGURES 2 and 8. As the table beings to shift from the dumping position, the link 68 shifts downwardly, adapting the jaws to clampingly engage the helical. Thereafter, an electrical circuit is completed to the electrodes 16 to heat treat the helical, then the clamping jaws 15 open (FIGURE 10) to deliver the helical to the receptacle 5. The clamping jaws are shifted to the open position by means of the air cylinder indicated at 75 in FIGURE 2. As the jaws open, the ejector fingers are shifted to the ejecting position, as explained later.

Electrode and Jaw Assembly

Referring to FIGURES 11 and 12, the stationary electrodes 16 are mounted upon a fixed shaft 76 having its opposite ends supported by the end plates 18 and 20. Each stationary electrode comprises a metal clamping block 77 which is keyed to the shaft 76. Each block 77 is slotted as at 78 and clamped in place upon shaft 76 by a bolt 80. The stationary electrodes are located along shaft 76 at spaced intervals (FIGURE 11) to provide individual circuits throughout the length of the helical.

Each electrode 16 comprises a terminal bar 81 (FIGURES 11 and 12) secured by screws 83 to a block 82 formed of an insulating material. The insulating block 82 is attached to the clamping block 77 by means of screws 84. As viewed in FIGURE 12, each terminal bar 81 is generally right angular and each includes a vertical guide bar 85 attached to its vertical limb 86. A contact block 87 is seated against the guide bar 85 and secured in place by a bolt 88. Electrical energy is applied to each terminal bar 81 by way of conduits which are attached as at 90 to the outer end of each bar. The electrical energy passes from the terminal bar through the guide bar 85 and contact block 87 to the helical 6 which is clamped against the block 87 by the clamping jaw 15.

Each clamping jaw 15 is mounted for rocking motion upon an actuating lever 91 (FIGURES 11 and 12) which rises from the rock shaft 74. The lower portion of each lever is slotted as at 92 and is clamped to shaft 74 by a bolt 93. A key 94 locks the lever against rotary motion relative to the shaft.

Each jaw 15 comprises a block 95 formed of insulating material and pivotally connected as at 96 to the upper end of lever 91 (FIGURES 6, 11 and 12). The pivotal mounting permits the block to rotate slightly as it engages and disengages the helical. This rocking motion imparts rotary motion to the helical so as to provide a wiping contact, and also prevents the helical from adhering to the electrode surface after having been heat treated. In order to provide this rocking motion, each block 95 is biased toward the stationary electrode by means of a tension spring 97 which is anchored to a bar 98. The bar 98 is attached by a screw 100 to block 95 (FIGURE 12). The opposite end of the spring is anchored upon a pin 101 projecting from one side of lever 91 (FIGURE 6). An adjustment screw 102 (FIGURE 11) is threaded through the bar 98 and its inner end engages the lever 91; screw 102 thus holds the block 95 in the position of FIGURE 12 counter to the bias effect of spring 97.

The helical is engaged by a metal jawpiece 103 which is attached to the block 95 by a bolt 104 (FIGURE 12). The jaw piece includes an upper portion which flares outwardly as at 105 and delineates a guide way in conjunction with the inclined upper portion of the guide bar 85. The lower portion of the jaw piece is recessed as at 106 to embrace the helical; a spur 107 projects outwardly below the recess.

The clamping jaws 15 are normally spring urged toward the stationary electrodes 16, with the spurs 107 engaging the electrodes, as shown in FIGURE 6. When the jaws open partially to loading position (FIGURE 7) the spurs 107 support the helical in position to be clamped. When the jaws are shifted to the clamping position (FIGURE 8) the block 95 and jaw piece 103 rock about the pivot 96, as indicated by the arrow, counter to the action of spring 97. As the jaws shift toward the open position (FIGURES 9 and 10) the jaw pieces rock in the opposite direction as indicated. In the fully opened position, the spurs 107 shift sufficiently clear of the stationary electrodes 16 to permit the helical to drop by gravity to the receptacle 5.

As shown in FIGURE 2, the cylinder 75, which actuates the clamping jaws 15, includes a piston rod 108 having a yoke 110 which is slotted as at 111. A lever 112 includes a pin 113 slidably interfitting the slot 111. The lever 112 is clamped by a bolt 114 to the rock shaft 74 which actuates the clamping jaws 15. The slot 111 permits the lever 112 to shift slightly, thereby allowing the jaw to shift to its partially open receiving position (FIGURE 7) when the table 12 is shifted to its dumping position by operation of cylinder 61, as described earlier. It will be observed therefore, that the jaws 15 are shifted to the loading position of FIGURE 7 by operation of cylinder 75.

Cylinder 75 includes air pressure conduits 115 and 116 which communicate with a solenoid valve (FIGURE 14) similar to the valve of cylinder 61. The solenoid valve is interconnected in the control circuit to shift the jaws to the open position after the heat treating current is applied to the helical by way of the stationary electrodes 16.

In order to dislodge the heat treated helical from the electrode assembly, the ejector fingers 17 are shifted to the ejecting position when the jaws 15 are opened to the discharge position, as indicated by the arrows in FIGURE 10. As viewed in FIGURE 11, there is provided an individual ejector finger 17 adjacent each stationary electrode 16. The ejector fingers are mounted upon a rock shaft 117 which extends parallel with rock shaft 74, and which is similarly journalled in the end plates 18 and 20.

As viewed in FIGURE 6, each ejector finger 17 rises from a mounting block 118 which is keyed to rock shaft 117 and clamped thereon by a bolt 120. The ejector fingers 17 normally reside in the retracted position shown in FIGURE 6, and are shifted to the position of FIGURE 10 concurrently with the opening of the clamping jaws 15. For this purpose, there is provided a linkage connection (FIGURE 5) between the rock shaft 74 of the clamping jaws and the rock shaft 117 of the ejector fingers. The interconnection comprises a lever 121 keyed to rock shaft 74 and clamped in place by a bolt 122. A similar lever 123 is keyed and clamped in place on the rock shaft 117. A link 124 is pivotally connected as at 125—125 to the swinging ends of the levers. Accordingly, as the cylinder 75 shifts the clamping jaws to the open position as indicated in FIGURE 10, the linkage connection concurrently shifts the fingers 17 to the ejecting position.

The clamping jaws 15 and ejector fingers 17 are normally biased toward the closed position by a tension spring 126 (FIGURE 2). Spring 126 has one end connected to a bar 127 which is attached to the lever 112. The opposite end of spring 126 is anchored upon a bracket 128 which projects from the yoke 110. The spring thus holds the pin 113 against the end of slot 111 with the jaws in closed position, but permits the jaws to shift to the partially open loading position under the action of the table cylinder 61.

As shown in FIGURE 2, the rearward end of the power cylinder 75 is pivotally connected as at 130 to a bracket 131. The bracket in turn is supported by a channel iron 132 which projects outwardly from the end plate 18.

Control Circuit

As noted earlier, each cycle of operation is initiated when the limit switch 11 (FIGURE 4) is tripped by the helical 6 upon advancement thereof from the coil forming machine. This switch stops the coiling machine and severs the helical and also energizes the cylinder 61, causing the table to tilt (FIGURE 7) to allow the helical to drop by gravity to the electrode assembly. As shown in FIGURE 2, a limit switch 133 is mounted above the lever 56 and has an arm 134 adapted to be tripped upon actuation of the lever. A second limit switch 135 is mounted adjacent the cylinder 75 and includes an arm 136 adapted to be actuated by a lug 137 projecting from the yoke 110. The limit switches 133 and 135 provide sequential operation of the components of the machine after the cycle is initiated by the limit switch 11.

Figure 14:
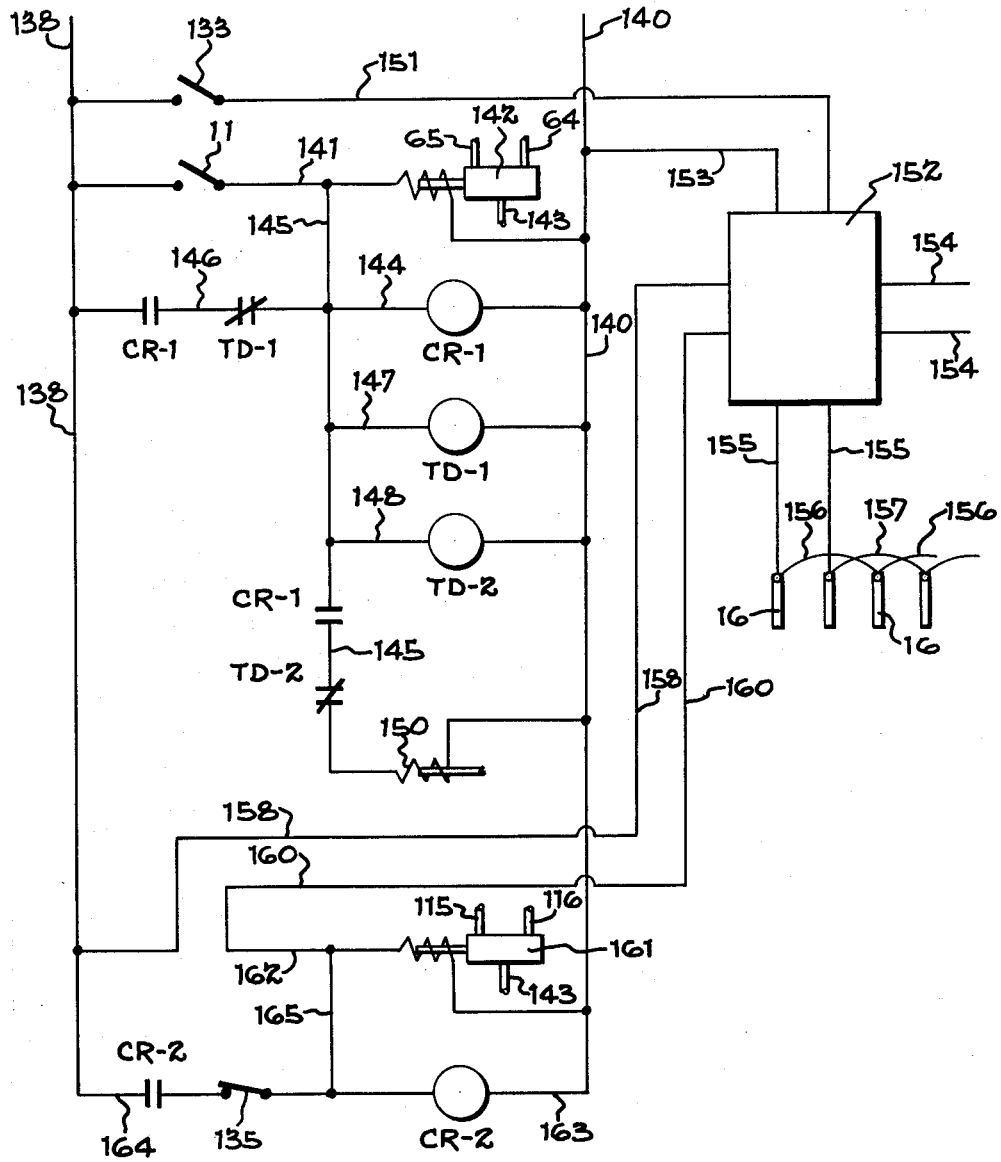
FIGURE 14 is a diagrammatic view showing the electrical control circuit of the heat treating machine.

Referring to the control circuit shown in FIGURE 14, the circuit is powered by the lines 138 and 140. The limit switch 11 which is normally open is interposed in a branch line 141 leading to the coil of a table solenoid valve indicated diagrammatically at 142. This valve normally supplies air pressure from a conduit 143 to the conduit 65 of the table cylinder 61 while exhausting by way of conduit 64, so as to hold the table 12 in the position shown in FIGURES 2 and 6. When the limit switch 11 is closed by the leading end of the helical, the coil of the solenoid valve 142 is energized by way of line 141, causing air pressure to be supplied to the conduit 64 and exhausted by way of conduit 65 of cylinder 61, thus shifting the table 12 to the dumping position of FIGURE 7.

Upon being closed, limit switch 11 also energizes the coil of a holding relay CR–1 which is interposed in branch line 144 leading from line 145. Upon being energized, relay CR–1 closes its normally open contact CR–1 in line 146, thus establishing a holding circuit from line 138, contact CR–1, through the normally closed time delay contact TD–1, through line 145 and to the coil of solenoid valve 142. The solenoid valve thus is held in the table tilting position after the helical is dumped and with the limit switch 11 in open position.

In order to shift the table from the dumping position (FIGURE 7) back to the normal position (FIGURE 8), there is provided a time delay relay TD–1 in branch line 147, which is also energized by the limit switch 11. Relay TD–1 includes a normally closed contact TD–1 in line 146, in series with contact CR–1 which is now closed. The table thus remains in its dumping position by operation of the holding circuit until relay TD–1 times out.

When limit switch 11 is closed momentarily by the helical, it also completes a circuit to time delay relay TD–2 in branch line 148. This relay includes a normally closed contact TD–2 in line 145, which leads to one side of the coil 150 of a clutch solenoid, which forms part of the coiling machine. When clutch coil 150 is energized, it trips the clutch and thus stops the operation of the coiler.

It will be recalled that the limit switch 11 opens when the helical discharges, from the table. When the relay TD–1 times out and opens its contact TD–1, the holding circuit (CR–1) and also the circuit to the valve 142 is deenergized, causing the valve to shift under spring influence back to its normal position, whereby the table shifts back to its normal position as shown in FIGURE 8.

When the table is shifted back to its normal position (FIGURE 2) it closes the table limit switch 133, which is interposed in line 151 (FIGURE 14) leading to a power supply unit, indicated diagrammatically at 152. The circuit is completed from line 138, through the power supply unit, and by way of line 153 to line 140. The power unit is a commercial structure including the required transformer windings for applying electrical energy to the electrodes 16 and also includes suitable relays to time the application of heat to the helical. When the power unit 152 is energized, electrical energy is transmitted from the power lines 154—154 to the lines 155—155. The power lines 155 are interconnected with the electrodes 16 by individual branch lines 156 and 157 (FIGURE 13). It will be noted that these branch lines provide individual circuits through the helical between adjacent electrodes, such that the helical is heated to a uniform temperature throughout its entire length.

After the power unit 152 times out, it causes the jaws to be shifted to the open position (FIGURE 10) so as to allow the heat treated electrode to drop by gravity to the receptacle 5. For this purpose, the power unit is interconnected with the control circuit by way of the branch lines 158 and 160. At the end of the heating period, the power unit momentarily completes a circuit from branch line 158 to branch line 160 (by operation of time delay means within the unit 152) thus energizing the coil of a solenoid valve 161 in branch line 162. Upon being energized, the solenoid valve supplies air pressure from supply conduit 143 to the conduit 116 of jaw cylinder 75 (FIGURE 2) and exhausts the air pressure by way of conduit 115, so as to open the jaws.

Since the power unit 152 operates momentarily to energize the jaw solenoid valve 161, a holding circuit is arranged to keep the valve energized and the jaws fully opened (FIGURE 10) to permit the treated helical to escape and then to close the jaws (FIGURE 9) for the next cycle of operation. For this purpose, there is provided a relay CR–2 interposed in a branch line 163, which is energized when the solenoid valve 161 is energized to its jaw opening position. Relay CR–2 includes a normally open contact CR–2 in line 164, the contact being in series with the normally closed switch 135 (FIGURE 2) which is actuated by the jaw actuating cylinder 75.

When the solenoid valve 161 is energized by the power unit, relay CR–2 closes its contact CR–2 so as to provide a holding circuit by way of line 164, branch line 165 and through the coil of solenoid valve 161. As cylinder 75 shifts the jaws to their open position (FIGURE 10) the lug 137 of piston rod 108 trips the arm of limit switch 135, so as to open the holding circuit (lines 164 and 163) thereby to deenergize relay CR–2. Since the circuit by way of lines 164 and 165 is now open, solenoid valve 161 is deenergized, and is shifted back to its normal position by spring operation, causing air pressure to be admitted to conduit 115 and exhausted by way of conduit 116 (FIGURE 2) so as to close the jaws for the next cycle of operation.

It will be understood that during the opening and closing of the jaws in response to the heating circuit, relay TD–2 will have timed out and opened its contact TD–2 in line 145, thereby to re-engage the clutch of the coiling machine. Accordingly, the coiling machine will have begun to advance the next helical to the guide mechanism while the preceding helical is being heat treated and discharged. This overlap in the cycles speeds up the operation of the machine, since it permits the coiling machine to operate almost continuously at its maximum rate of speed.

*Summary of Operation*

The cycle of operation is initiated when switch 11 is closed momentarily by the advancing helical. This switch energizes solenoid valve 142, causing the table 12 to tilt to dumping position (FIGURE 7). Switch 11 also energizes the holding circuit through relays CR–1 and TD–1, such that the table is shifted back to normal position after a slight time delay. When the table reaches its dumping position it also opens the jaws 15 slightly by way of link 68 (FIGURE 7) to permit the helical to drop in position between the slightly open jaws to be clamped for heat treatment when the jaws close (FIGURE 8.)

Upon being closed momentarily by the helical, limit switch 11 also energizes the clutch solenoid coil 150 of the coiling machine so as to disengage the clutch and stop the coiler. The clutch is automatically engaged after the time period provided by relay TD–2, such that formation of the next helical may be started when the table is shifted back to its normal position.

When cylinder 61 shifts the table to dumping position, it also momentarily closes the normally open limit switch 133 and thereby initiates the heating cycle. After the jaws close, the timing components of the power unit 152 apply heating voltage to the electrodes for a predetermined time interval.

After the power unit times out, it momentarily energizes the coil of the jaw solenoid valve 161, so as to shift the jaws to open position. The power unit also energizes the holding relay CR–2, such that the jaw solenoid valve remains energized until the jaws are fully opened. At this point, normally closed limit switch 135 is opened so as to deenergize the holding circuit and jaw solenoid valve, permitting the jaws to shift back to closed position, ready for the next cycle of operation.

Having described our invention, we claim:

1. A machine for heat treating workpieces comprising, a tiltable support element adapted to support a workpiece, an electrode element mounted beneath said support element and adapted to be shifted to an open position to receive a workpiece from said support element, said tiltable support element normally residing in a plane which is inclined downwardly toward the electrode element, a stationary stop element mounted above the tiltable support element adjacent the lower portion thereof and adapted to arrest a workpiece resting on the support element, said electrode element adapted to be shifted to a closed position to clampingly engage the workpiece, actuating means adapted to tilt the support element in a direction to swing the lower portion thereof downwardly relative to the stationary stop element to a tilted discharge position when the electrode element is in an open position, whereby the workpiece is dropped by gravity from the support element into the open electrode element, means adapted to shift said electrode element to the closed position after the workpiece is dropped therein, and means for supplying electrical energy to said electrode element, thereby to heat the workpiece which is confined therein.

2. A machine for heat treating workpieces comprising, a tiltable support element adapted to support a workpiece, an electrode element mounted beneath said support element and adapted to be shifted to an open position to receive a workpiece from said support element, said tiltable support element normally residing in a plane which is inclined downwardly toward the electrode element, a stationary stop element mounted above the tiltable support element and engaging the lower portion thereof, said stop adapted to arrest a workpiece resting on the tiltable support element, said electrode element adapted to be shifted to a closed position to clampingly engage the workpiece and to provide an electrical contact therewith, actuating means adapted to tilt the support element in a direction to swing the lower portion thereof downwardly relative to the stationary stop element to a tilted discharge position and to shift the electrode element to an open position, whereby a workpiece is dropped by gravity from the support element into the electrode element, said actuating means thereafter adapted to shift said electrode element to said closed position, and means for supplying electrical energy to the electrode element, thereby to heat the workpiece which is confined therein.

3. A machine for heat treating workpieces comprising, a tiltable work support element, an electrode element mounted beneath said work support element, said tiltable support element normally residing in a plane which is inclined downwardly toward the electrode element, a stationary guide member mounted above the tiltable support element, said guide member having an open side presented to the lower portion of the support element and adapted to confine a workpiece resting upon the tiltable support element, an electrode actuating means adapted to shift the electrode element from a closed position to a fully opened position, work support actuating means adapted to tilt the support element in a direction to swing the lower portion downwardly relative to the guide means from the normal work support position to a work discharge position, said support actuating means interconnected with said electrode element and adapted to shift the electrode element to a partially opened position when said support element is shifted to said tilted discharge position, said electrode element adapted to receive and loosely support the discharged workpiece when in said partially open position.

4. A machine for heat treating workpieces comprising, a tiltable work support element, an electrode element mounted beneath said work support element, an electrode actuating means adapted to shift the electrode element from a closed position to a fully opened position, support actuating means adapted to shift the work support element from a normal work support position to a tilted work discharge position, said support actuating means interconnected with said electrode element and adapted to shift the same to a partially opened position when said support element is shifted to said tilted discharge position, said electrode element adapted to receive and loosely support the discharged workpiece when in said partially open position, said support actuating means adapted to shift the support element back to said normal position after discharging the workpiece and to shift the electrode element to said closed position, whereby the workpiece is clampingly engaged therein, and means for applying electrical energy to said electrode element when in said closed position, thereby to heat the workpiece confined therein.

5. A machine for heat treating workpieces comprising, a tiltable work support element, an electrode element mounted beneath said work support element, electrode actuating means adapted to shift the electrode element from closed position to a fully opened position, support actuating means adapted to shift the support element from a normal work support position to a tilted work discharge position, said support actuating means interconnected with said electrode element and adapted to shift the same to a partially opened position when said support element is shifted to said tilted discharge position, said electrode element adapted to receive and loosely support the discharged workpiece when in said partially open position, whereby the workpiece drops from the support element into said electrode element when the support element is shifted to said tilted position by said support actuating means, said support actuating means thereafter adapted to shift the support element back to said normal position and to shift the electrode element to said closed position, whereby the workpiece is clampingly engaged therein, means for applying electrical energy to said electrode element, thereby to heat the workpiece confined therein and ejector means associated with said electrode element, said electrode actuating means adapted to open the electrode element and to shift the ejector means to an ejecting position after the workpiece is heated.

6. A machine for heat treating an elongated helical or the like, comprising an elongated helical guide having an open bottom, an elongated tiltable table normally residing beneath the open bottom of said guide and adapted to support an elongated helical which is advanced into said guide, an elongated electrode assembly mounted beneath said table and adapted to be shifted to an open position to receive a helical from said table, said electrode assembly adapted to be shifted to a closed position to clampingly engage the helical and to provide an electrical heating circuit through the helical, table actuating means connected to said table and to said electrode assembly and adapted to shift said table to a tilted discharge position and concurrently to shift the electrode assembly to a partially open position, whereby the helical is dropped by gravity from the table into the partially open electrode assembly, said table actuating means adapted to shift the electrode assembly to said closed position into clamping engagement with the helical and concurrently to shift the table to said normal position, and means for supplying electrical heating energy to said electrode assembly, thereby to heat the helical which is confined therein.

7. A machine for heat treating an elongated helical or the like comprising, an elongated helical guide having an open bottom, an elongated tiltable table normally residing beneath the open bottom of said guide and adapted to support an elongated helical which is advanced into said guide, an elongated electrode assembly mounted beneath said table and adapted to be shifted to an open position to receive a helical from said table, said electrode assembly adapted to be shifted to a closed position to clampingly engage the helical and to provide an electrical heating circuit through the helical, table actuating means connected to said table and to said electrode assembly and adapted to shift said table to a tilted discharge position and concurrently to shift the electrode assembly to a partially open position, whereby the helical is dropped by gravity from the table into the partially open electrode assembly, said table actuating means adapted to shift the electrode assembly to said closed position into clamping engagement with the helical, and concurrently to shift the table to said normal position, means for supplying electrical heating energy to said electrode assembly, thereby to heat the helical which is confined therein, and electrode actuating means adapted to open said electrode assembly after the helical is heated for discharging the same by gravity from the electrode assembly.

8. A machine for heat treating an elongated helical or the like comprising, an elongated helical guide having an open bottom, an elongated tiltable table and normally residing beneath said guide and adapted to support a helical which is advanced into said guide, an elongated electrode assembly mounted beneath said table and adapted to be shifted to an open position to receive a helical wire from said table, said electrode assembly adapted to be shifted to a closed position to clampingly engage the helical and to provide an electrical heating circuit through the helical, table actuating means connected to said table and to said electrode assembly and adapted to shift said table to a tilted discharge position and concurrently to shift the electrode assembly to a partially open position, whereby the helical is dropped by gravity from the table into the open electrode assembly, said table actuating means adapted to shift the electrode assembly to said closed position into clamping engagement with the helical and concurrently to shift the table to said normal position, means for supplying electrical heating energy to said electrode assembly, thereby to heat the helical which is confined therein, electrode actuating means adapted to open said electrode assembly after the helical is heated for discharging the same by gravity from the electrode assembly, and a plurality of ejector fingers normally residing in a retracted position, and means for shifting said ejector fingers from said retracted position to an ejecting position relative to the helical, thereby to dislodge the same when the electrode assembly is opened by the electrode actuating means.

9. A machine for heat treating an elongated helical or the like comprising, an elongated helical guide having an open bottom, an elongated tiltable table and normally residing beneath said guide and adapted to support a helical which is advanced into said guide, an elongated electrode assembly mounted beneath said table and adapted to be shifted to an open position to receive a helical wire from said table, said electrode assembly adapted to be shifted to a closed position to clampingly engage the helical and to provide an electrical heating circuit through the helical, table actuating means connected to said table and to said electrode assembly and adapted to shift said table to a tilted discharge position and concurrently to shift the electrode assembly to a partially open position, whereby the helical is dropped by gravity from the table into the open electrode assembly, said table actuating means adapted to shift the electrode assembly to said closed position into clamping engagement with the helical and concurrently to shift the table to said normal position, means for supplying electrical heating energy to said electrode assembly, thereby to heat the helical which is confined therein, electrode actuating means adapted to open said electrode assembly after the helical is heated for discharging the same by gravity from the electrode assembly, and a plurality of ejector fingers normally residing in a retracted position, and means interconnecting said ejector fingers with the electrode actuating means and adapted to shift said ejector fingers from said retracted position to an ejecting position relative to the helical wire for dislodging the same when the electrode assembly is shifted to said open position.

10. A machine for heat treating an elongated helical or the like comprising, an elongated guide having an open bottom and adapted to receive a helical as the same is advanced lengthwise therein, a tiltable table normally residing beneath the open bottom of the helical guide and adapted to support the helical therein, an electrode assembly mounted beneath said elongated guide, a plurality of jaw elements mounted adjacent said electrode assembly, jaw actuating means connected with said jaw elements and adapted to shift the same from a clamping position to a fully open discharge position relative to the electrode assembly, table actuating means interconnected with said table and adapted to shift the same from said normal position to a tilted gravity discharge position, whereby a helical in said guide is dropped by gravity toward the electrode assembly, linkage elements interconnecting the table actuating means and jaw elements and adapted to shift said jaw elements to a partially open position when the table is shifted to said tilted discharge position, said clamping elements in said partially open position adapted to receive and loosely support the helical which is dropped by gravity from the said tilted table, said table actuating means adapted to shift said table from said tilted position to the normal position adapting the jaw elements to clamp the helical in electrical contact with said electrode assembly after discharging the helical, and means for applying electrical heating energy to said electrode assembly after said clamping jaws are shifted to said clamping position, thereby to heat the helical wire.

11. A machine for heat treating an elongated helical or the like comprising, an elongated guide having an open bottom and adapted to receive a helical as the same is advanced lengthwise therein, a tiltable table normally residing beneath the open bottom of the helical guide and adapted to support the helical therein, an electrode assembly mounted beneath said elongated guide, a plurality of jaw elements mounted adjacent said electrode assembly, jaw actuating means connected with said jaw elements and adapted to shift the same from a clamping position to a fully open discharge position relative to the electrode assembly, table actuating means interconnected with said table and adapted to shift the same from said normal position to a tilted gravity discharge position, whereby a helical in said guide is dropped by gravity toward the electrode assembly, linkage means interconnecting the table actuating means and jaw elements and adapted to shift said jaw elements to a partially open position when the table is shifted to said tilted discharge position, said clamping elements in said partially open position adapted to receive and loosely support the helical which is dropped by gravity from the said tilted table, said table actuating means adapted to shift said table from said tilted position to the normal position adapting the jaw elements to clamp the helical in electrical contact with said electrode assembly after discharging the helical, said electrode assembly having a plurality of electrode elements spaced apart from one another and adapted to provide spaced electrical contacts along said helical, and means for applying electrical energy to said electrode elements after said clamping jaws are shifted to said clamping position, said means providing individual electrical heating circuits through the helical between adjacent electrode elements, thereby to heat the helical uniformly throughout the length thereof.

12. A machine for heat treating an elongated helical or the like comprising, an elongated guide having an open bottom and adapted to receive a helical wire as the same is advanced lengthwise therein, a tiltable table normally residing beneath the open bottom of the helical guide and adapted to support the helical wire therein, an electrode assembly mounted beneath said helical guide, a plurality of clamping jaws mounted adjacent said electrode assembly, jaw actuating means connected with said jaw elements adapted to shift the same from a clamping position to a fully open discharge position relative to the electrode assembly, table actuating means interconnected with said table and adapted to shift the same from said normal position to a tilted gravity discharge position, whereby a helical in said guide is dropped by gravity toward the electrode assembly, linkage means interconnecting the table actuating means and jaw elements and adapted to shift said jaw elements to a partially open position when the table is shifted to said tilted discharge position, said jaw elements in said partially open position adapted to receive and loosely support the helical which is discharged by gravity from the said tilted table, said table actuating means adapted to shift said table from said tilted position to the normal position adapting the jaw elements to clamp the helical in electrical contact with said electrode assembly, and a plurality of ejector elements shiftably mounted adjacent the electrode assembly and normally residing in a retracted position, and means interconnecting said ejector elements with said jaw actuating means for shifting the ejector fingers from said retracted position into engagement with the helical for dislodging the same from the electrode assembly when said clamping jaws are shifted to an open position by said jaw actuating means.

13. In a machine for heat treating an elongated helical or the like, an electrode assembly comprising a series of electrodes spaced apart from one another and adapted to contact a helical at points spaced along the length thereof, a plurality of clamping blocks mounted adjacent said electrodes, mounting means adapted to support said clamping blocks, pivot means connecting said clamping blocks to said mounting means adapting the clamping jaws to rock relative to the mounting means, each of said clamping blocks including a jaw piece engageable with a respective electrode of said series, means for shifting said mounting means to a position partially retracting said jaw pieces from said electrodes, whereby a helical may be fed between the electrodes and jaw pieces, means for shifting said mounting means toward the electrodes, whereby said jaw pieces force the helical into clamping engagement with the respective electrodes, said pivotally mounted clamping blocks adapted to rock relative to said clamping levers upon engaging said helical, whereby the jaw pieces partially rotate the helical as the same is forced into engagement with the electrodes, thereby to provide a wiping action relative to the electrodes to improve the electrical connection between the electrodes and helical.

14. A machine for heat treating an elongated helical or the like, an electrode assembly comprising a series of electrodes spaced apart from one another and adapted to contact a helical at points spaced along the length thereof, a rock shaft mounted adjacent to and parallel with said electrodes, respective clamping levers mounted on said rock shaft, a respective clamping element pivotally mounted on the swinging portion of each of said clamping levers and adapted to rock relative to said levers, each of said clamping blocks engageable with a respective electrode of said series, means for shifting said rock shaft to a position partially retracting said clamping blocks from said electrodes, whereby a helical wire may be fed between the electrodes and clamping blocks, means for shifting said rock shaft toward a clamping position, whereby said clamping blocks force the helical into clamping engagement with the respective electrodes, said pivotally mounted clamping blocks adapted to rock relative to said clamping levers upon engaging said helical, whereby the clamping blocks partially rotate the helical as the same is forced into engagement with the electrodes, thereby to provide a wiping action relative to the electrodes to improve the electrical contact between the electrodes and helical.

15. In a machine for heat treating an elongated helical or the like, an electrode assembly comprising a plurality of electrodes spaced apart from one another and adapted to contact a helical at points spaced along the length thereof, a rock shaft mounted adjacent to and parallel with said electrodes, respective clamping levers mounted on said rock shaft, a respective clamping block pivotally mounted on the swinging portion of each of said clamping levers and adapted to rock relative to said levers, each of said clamping blocks including a spur projecting toward the associated electrode, means for shifting said rock shaft to a position partially retracting said jaw pieces from said electrodes, whereby a helical wire may be fed between the electrode and clamping blocks and supported upon the spurs thereof, means for shifting said rock shaft toward a clamping position, whereby said clamping blocks force the helical into clamping engagement with the respective electrodes, said pivotally mounted clamping blocks adapted to rock relative to said clamping levers upon engaging said helical, whereby the clamping blocks partially rotate the helical as the same is forced into engagement with the electrodes, thereby to provide a wiping action relative to the electrodes to improve the electrical contact between the electrodes and helical.

16. In a machine for heat treating an elongated helical or the like, an electrode assembly comprising a plurality of electrodes spaced apart from one another and adapted to contact a helical at points spaced along the length thereof, a rock shaft mounted adjacent to and parallel with said electrodes, respective clamping levers mounted on said rock shaft, a respective clamping block pivotally mounted on the swinging portion of each of said clamping levers and adapted to rock relative to said levers, each of said clamping blocks including a spur projecting toward the associated electrode, means for shifting said rock shaft to a position partially retracting said jaw pieces from said electrodes, whereby a helical wire may be fed between the electrode and clamping blocks and supported upon the spurs thereof, means for shifting said rock shaft toward a clamping position, whereby said clamping blocks force the helical into clamping engagement with the respective electrodes, said pivotally mounted clamping blocks adapted to rock relative to said clamping levers upon engaging said helical, whereby the clamping blocks partially rotate the helical as the same is forced into engagement with the electrodes, and spring biasing means interconnecting said clamping blocks and levers adapted to resist the said rocking motion of the clamping blocks, said spring biasing means rocking said clamping blocks in the opposite direction when the clamping blocks are retracted from the electrodes, whereby said clamping blocks impart rotary motion to the helical to dislodge the same from said electrodes.

References Cited in the file of this patent

UNITED STATES PATENTS

| | | |
|---|---|---|
| 1,509,097 | Bisset et al. | Sept. 23, 1924 |
| 1,647,296 | Jefferies | Nov. 1, 1927 |
| 2,094,977 | Bitler et al. | Oct. 5, 1937 |
| 2,116,327 | Simmons | May 3, 1938 |